July 14, 1925.

O. OELZE 1,545,920

MAGNET TELEPHONE

Filed Dec. 10, 1924

Inventor
Otto Oelze
by Knight Bro,
Attorneys

Patented July 14, 1925.

1,545,920

UNITED STATES PATENT OFFICE.

OTTO OELZE, OF KIEL, GERMANY.

MAGNET TELEPHONE.

Application filed December 10, 1924. Serial No. 754,951.

*To all whom it may concern:*

Be it known that I, OTTO OELZE, engineer, citizen of the German Republic, and residing at Kiel, county of Schleswig-Holstein, State of Prussia, Germany, have invented certain new and useful Improvements in Magnet Telephones, of which the following is a specification.

The invention refers to magnet telephones. It involves a special method in the assembling of such telephones by which the initial manufacturing costs are considerably reduced. The invention further involves a peculiar form of the magnet-system employed.

According to the invention the magnet system is, contrary to previous practice, not fitted loosely in the casing and then fastened inside the casing by means of screws but is forced into the casing by means of pressure. The casing-walls are hereby stretched elastically so that the magnet-system is held quite fast by the friction caused by the elastic force of the casing.

The casing suitable for the method according to the invention should be normally—i. e., before the insertion of the magnet system—at least equal to or preferably slightly smaller in diameter, at the points of contact with the system, than the greatest width of the system. Besides the magnet system must naturally constitute a complete integral magnetic system, whose magnetic circuit is closed by the diaphragm, and the system must be rigid enough so as not to be easily deformed by the pressure due to the insertion.

Figure 1:
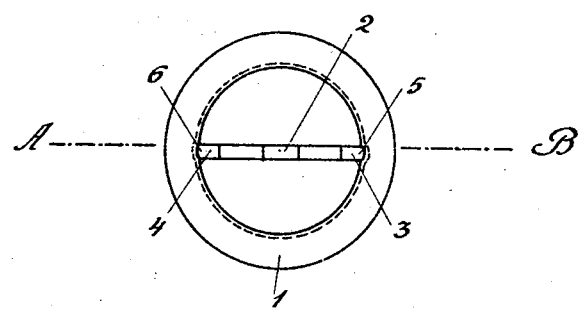
Figure 2:
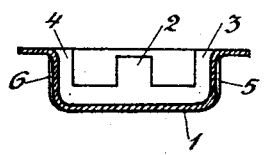

An example of a magnetic system so encased is represented in the drawings which show in Fig. 1 a top view of a telephone casing with the magnet system fitted according to the invention and Fig. 2 a section of Fig. 1 on the line A—B. 1 is the casing and 2 the magnet. The magnet 2 has a form especially suitable for the method according to the invention. It is in general composed of a prismatic body on which three poles are formed by cutting out two prismatic spaces, so that an E-shaped magnet results. The magnet is best magnetized such that both outer poles 3 and 4 are homonymous poles while the pole lying in the middle has opposite polarity. 5 and 6 are two grooves pressed into the casing 1 serving for the reception of the outer poles 3 and 4 of the magnet system. The diameter of the casing, measured between these grooves, is slightly smaller than the over-all width of the system, measured between poles 3 and 4, so that when the magnet system is inserted by force, it is frictionally held in place in these grooves due to the elastic force exerted by the casing walls. The position of the magnet relatively to the casing is thus prescribed by these grooves to the operative inserting the magnet, so that accurate positioning of the magnet in the casing is insured.

I claim:

1. Method of attaching a magnet system within a telephone casing, consisting in forcing an integral complete magnet system into the casing, the latter having normally, at the points contacting with the system, a diameter at least not larger than the greatest width of the system, so that the magnet system is frictionally retained in the casing.

2. Method of attaching a magnet system within a telephone casing, consisting in forcing an integral complete magnet system into the casing, the latter having normally, at the points contacting with the system, a diameter slightly smaller than the greatest width of the system, so that the magnet system is frictionally retained in the casing.

3. Method of attaching a magnet system within a telephone casing, consisting in forcing an integral E-shaped magnet system with its outer shanks into the casing, the latter having normally, at the points contacting with the system, a diameter at least not larger than the outer distance between the outside shanks of the system, so that the magnet system is frictionally retained in the casing.

4. Method of attaching a magnet system within a telephone casing, consisting in forcing an integral E-shaped magnet system with its outer shanks into the casing, the latter having normally, at the points contacting with the system, a diameter slightly smaller than the outer distance between the outside shanks of the system, so that the magnet system is frictionally retained in the casing.

5. Method of attaching a magnet system within a telephone casing, consisting in forcing an integral E-shaped magnet system with its outer shanks into two axially extending grooves provided on diametrically opposite sides of the casing wall, the casing diameter between said grooves being slightly smaller than the outer distance between the outside shanks of the magnet system, so that the magnet system is frictionally retained in the casing.

In testimony whereof I affix my signature in presence of two witnesses.

OTTO OELZE.

Witnesses:
    T. KASPAREK,
    H. DEICKE.